United States Patent [19]
Sakata

[11] Patent Number: 5,557,426
[45] Date of Patent: Sep. 17, 1996

[54] IMAGE INFORMATION SIGNAL PROCESSING APPARATUS

[75] Inventor: Tsuguhide Sakata, Tokyo, Japan

[73] Assignee: Canon Kabushiki Kaisha, Tokyo, Japan

[21] Appl. No.: 315,194

[22] Filed: Sep. 29, 1994

Related U.S. Application Data

[63] Continuation of Ser. No. 201,072, Feb. 24, 1994, abandoned, which is a continuation of Ser. No. 28,768, Mar. 9, 1993, abandoned, which is a continuation of Ser. No. 942,344, Sep. 9, 1992, abandoned, which is a continuation of Ser. No. 460,318, Jan. 2, 1990, abandoned, which is a continuation of Ser. No. 255,110, Oct. 7, 1988, abandoned.

[30] Foreign Application Priority Data

Oct. 16, 1987 [JP] Japan .................................. 62-261006

[51] Int. Cl.$^6$ ............................. H04N 1/40; H04N 11/04
[52] U.S. Cl. .......................... 358/448; 348/489; 348/717
[58] Field of Search ..................................... 358/443, 445, 358/447, 448, 524, 530; 348/489, 717

[56] References Cited

U.S. PATENT DOCUMENTS

| | | | |
|---|---|---|---|
| 4,127,865 | 11/1978 | Poetsch | 358/12 |
| 4,516,150 | 5/1985 | Gurley | 358/13 |
| 4,520,386 | 5/1985 | Asaida | 358/13 |
| 4,549,201 | 10/1985 | Tanaka et al. | 358/13 |
| 4,573,068 | 2/1986 | Dorsey et al. | 358/13 |
| 4,613,893 | 9/1986 | Weitzel | 358/13 |
| 4,698,665 | 10/1987 | de Haan | 358/13 |

*Primary Examiner*—Edward L. Coles, Sr.
*Assistant Examiner*—Thomas D. Lee
*Attorney, Agent, or Firm*—Robin, Blecker, Daley & Driscoll

[57] ABSTRACT

An image information signal processing apparatus for processing a first image information signal having at least a first image signal and a second image signal which is different from the first image signal, and a second image information signal having a third image signal with a frequency band wider than that of the first image signal or the second image signal. When the first image information signal is input, the apparatus forms first image data corresponding to the first image signal and second image data corresponding to the second image signal by performing sampling of the first image information signal in accordance with a first sampling signal having a first sampling frequency. When the second image information signal is input, the apparatus forms third image data corresponding to the third image signal by performing sampling of the second image information signal in accordance with a second sampling signal whose frequency is higher than that of the first sampling signal. When storing the second image information signal, the apparatus alternately supplies the third image data to a first storage circuit capable of storing one picture plane portion of the first image data and to a second storage circuit capable of storing one picture plane portion of the second image data, each for a predetermined period. Thus, the apparatus makes it possible, with a simple construction, to store image information signals of different frequency bands without involving deterioration in picture quality.

36 Claims, 5 Drawing Sheets

IMAGE INFORMATION SIGNAL PROCESSING APPARATUS

This is a continuation application under 37 CFR 1.62 of prior application Ser. No. 08/201,072 filed on Feb. 24, 1994 (aban.) which is a cont. of Ser. No. 08/028,768 filed on Mar. 6, 1993 (aban.), which is a cont. of Ser. No. 07/942,344 filed on Sep. 9, 1992 (aban.), which is a cont. of Ser. No. 07/460,318 filed on Jan. 2, 1990 (aban.), which is a cont. of Ser. No. 07/255,110 filed on Oct. 7, 1988 (aban.).

BACKGROUND OF THE INVENTION

1. Field of the Invention

This invention relates to an image information signal processing apparatus, and in particular, to an image information signal processing apparatus for memorizing image information signals by means of semiconductor memories.

2. Description of the Related Art

Figure 1:
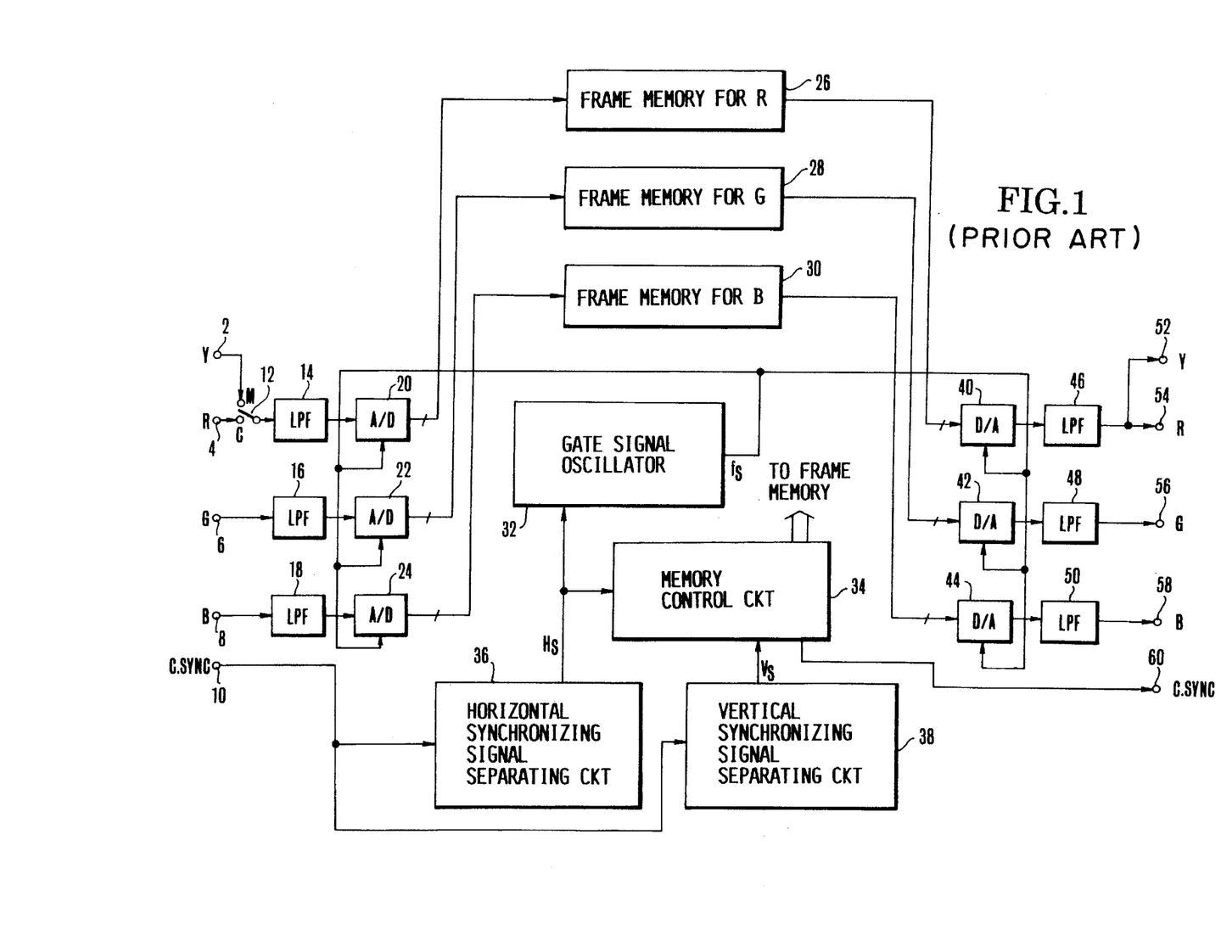
FIG. 1 is a schematic diagram of a conventional image signal memorizing apparatus.

Conventionally, an image signal memorizing apparatus has, for example, the construction shown in FIG. 1.

The apparatus shown in FIG. 1 includes input terminals 2, 4, 6, 8 and 10 for the luminance signal, the R-signal, the G-signal, the B-signal, and the composite synchronizing signal, respectively, a color/monochrome change-over switch 12, input low-pass filters (LPF) 14, 16, and 18 for preventing aliasing noise before the analog-to-digital (A/D) conversion, A/D converters 20, 22 and 24, frame memories 26, 28 and 30 for the R-, G- and B-signals respectively, a gate signal oscillator 32, a memory control circuit 34 for controlling the writing and reading of data in and out of the frame memories 26, 28 and 30, a horizontal synchronizing signal separating circuit 36, a vertical synchronizing signal separating circuit 38, digital-to-analog (D/A) converters 40, 42 and 44, output low-pass filters (LPF) 46, 48 and 50, and output terminals 52, 54, 56, 58 and 60 for the luminance, R-, G-, B- and composite synchronizing (C.SYNC) signals, respectively.

The output of the gate signal oscillator 32 provides the sampling clock signal for A/D conversion. The frequency of this sampling clock may be set, for example, to 780 $f_H$ ($f_H$ corresponds to the horizontal synchronization frequency 15.734 KHz), i.e., to 12.27 MHz. 780 $f_H$ is known as the sampling frequency resulting in a picture element length/breadth ratio of 1:1.

Figure 2A:
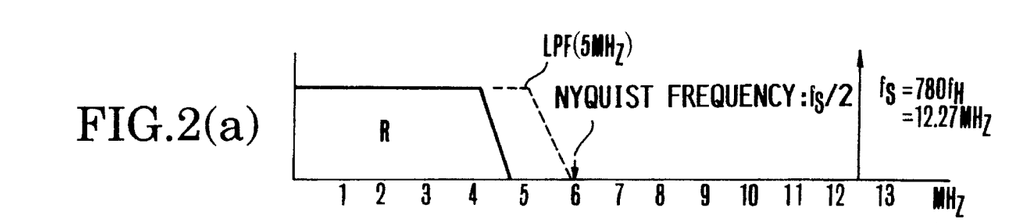
FIGS. 2(a) through 2(d) illustrate the relation between the sampling frequency and the restricted band of the low-pass filter with respect to the various signals.
Figure 2B:
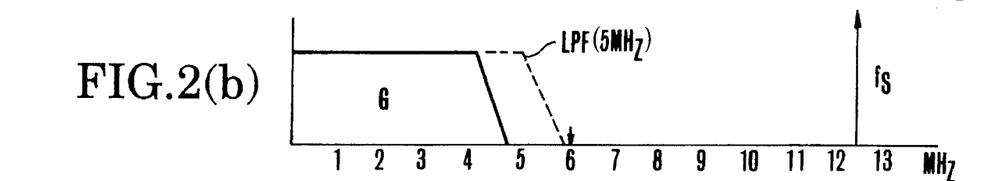
Figure 2C:
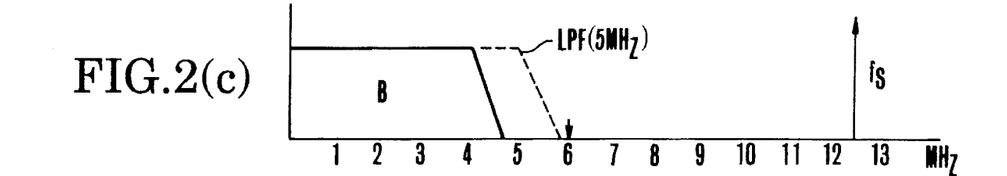

When using the above sampling frequency, a 5 MHz band is used for the input LPFs, 14, 16 and 18, as shown in FIGS. 2(a) to 2(c). The reason for using a 5 MHz band is that according to Nyquist's theorem, A/D conversion of a frequency equal to or more than ½ of the sampling frequency, i.e., 6.1 MHz, would result in aliasing noise, which would deteriorate the image quality. Accordingly, LPFs with a band of ca. 5 MHz are employed, bands of 6.1 MHz or more being cut sufficiently. LPFs with the same band, i.e., a 5 MHz band is also required by the LPFs on the output side of the D/A converters 40, 42 and 44, i.e., the LPFs 46, 48 and 50.

Figure 3:
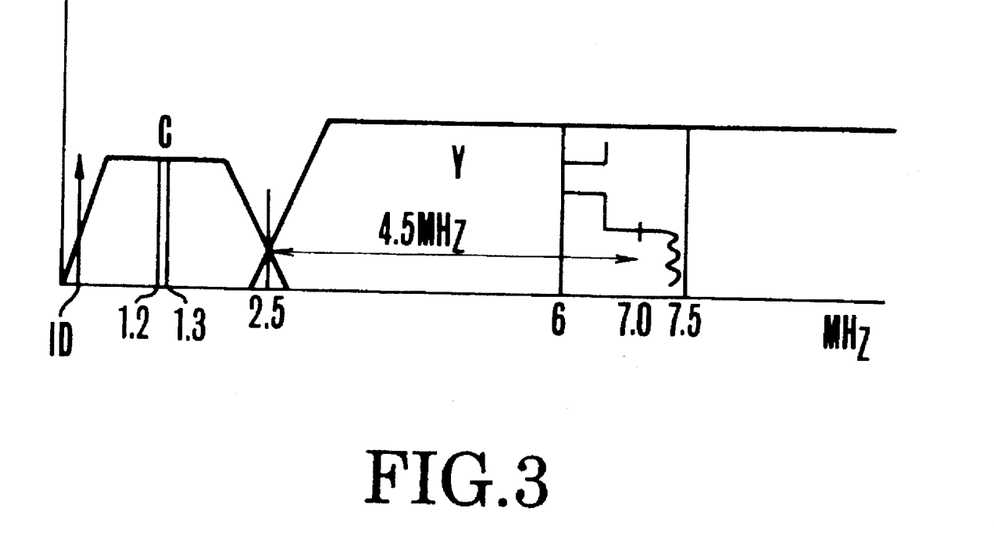
FIGS. 3 and 4 show the frequency allocations in a still video apparatus for color image signal correspondence and monochrome image signal correspondence, respectively.
Figure 4:
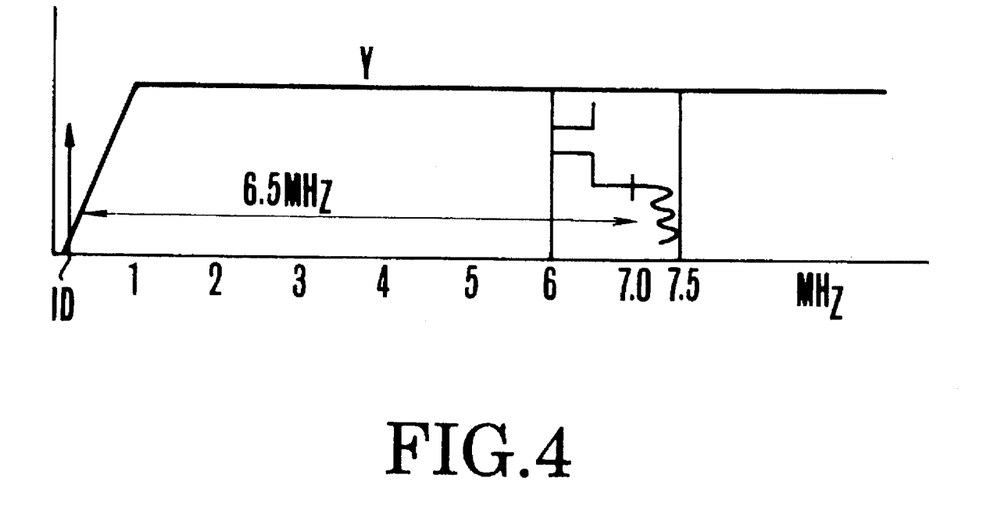

Recently, a so-called still video apparatus in which still image signals are recorded on a disc-like magnetic sheet with a diameter of 2 inches has come to be used. FIGS. 3 and 4 show the recording format of this still video apparatus. FIG. 3 shows the frequency allocation at the time of recording a color image signal in which the luminance signal as an FM modulation signal with a sync. tip frequency of 6 MHz and a white peak frequency of 7.5 MHz is frequency-multiplexed with the chrominance signal as a color-difference line-sequential frequency-modulated signal with center carrier frequencies of 1.2 MHz and 1.3 MHz for the R-Y and B-Y signals, respectively.

FIG. 4 shows the frequency allocation when a monochrome image signal is recorded. As shown in the figure, a format may be conceivable which enables the recording to be effected in such a manner that the luminance signal is more extended into the low frequency band because there exists no chrominance signal.

As shown in FIGS. 3 and 4, the luminance signal band for color image signal correspondence is ca. 4.5 MHz and the luminance signal band for monochrome image signal correspondence is ca. 6.5 MHz.

When freezing reproduced signals with the conventional image signal memorizing apparatus which is shown in FIG. 1 in such a still video apparatus in order to utilize them for various applications such as the attaining of special effects, the following problem is involved:

Since in the case of the above-described color image signal correspondence the band of the luminance signal (Y) is 4.5 MHz, the respective bands of the Y-signal and the color-difference signals (both R-Y and B-Y have a band of 1 MHz) when transformed into R, G and B signals will be R≈4.5 MHz;

G≈4.5 MHz; and

B≈4.5 MHz.

Accordingly, there will be no danger of the 4.5 MHz band of the above color image signals being damaged even when the band restriction to 5 MHz is effected at the input LPFs 14, 15 and 16 of the image signal memorizing apparatus shown in FIG. 1. In the case of a monochrome image signal, however, a band of 6.5 MHz is involved, as described above, so that when storing this monochrome image signal in the image signal memorizing apparatus shown in FIG. 1, it is necessary to connect the change-over switch 12 to the terminal M and to use the same input LPFs and sampling clock as in the case of a color image signal. In this case, part of the band must be cut off when freezing the signal in the image memory, so that the picture of the image of the signal read out from the image memory is deteriorated in quality.

SUMMARY OF THE INVENTION

Accordingly, it is an object of this invention to provide an image information signal processing apparatus which is capable of overcoming the problem stated above.

Another object of this invention is to provide an image information signal processing apparatus which is capable of storing image information signals of different frequency bands with a simple construction.

In view of the above, the present invention provides as an embodiment thereof an image information signal processing apparatus adapted to process a first image information signal having at least a first image signal and a second image signal which is different from the first image signal, and a second image information signal having a third image signal the frequency band of which is wider than that of the first image signal or the second image signal, the image information signal processing apparatus comprising:

image data formation means, arranged to selectively input the first image information signal or the second image information signal, for forming, when the first image information signal is input, first image data corresponding to the first image signal and second image data corresponding to the second image signal by performing sampling of the first image information signal in accordance with a first sampling signal having a first sampling frequency, and for forming, when the second image information signal is input, third image data corresponding to the third image signal by performing sampling of the second image information signal in accordance with a second sampling signal having a second sampling frequency which is higher than the first sampling frequency;

first storage means capable of storing one picture plane portion of the first image data formed by the image data formation means;

second storage means capable of storing one picture plane portion of the second image data formed by the image data formation means; and image data supply means for supplying, when the first image information signal is input to the image data formation means, the first image data and the second image data formed by the image data formation means to the first storage means and the second storage means, respectively, and for supplying, when the second image information signal is input to the image data formation means, the third image data formed by the image data formation means alternately to the first storage means and the second storage means, each for a predetermined period.

The present invention aims at providing an image data memorizing apparatus which is capable of memorizing two kinds of image data of different information amounts for one picture plane.

In view of the above, the present invention provides as another embodiment thereof an image data memorizing apparatus for memorizing first image data and second image data whose information amounts for one picture plane are different from each other, comprising:

a plurality of memory means capable of memorizing one picture plane portion of the first image data;

input means for selectively inputting the first image data and the second image data;

image data supply means for supplying one picture plane portion of the first image data input through the input means to one of the plurality of memory means, and for dividing one picture plane portion of the second image data input through the input means into a first sub-image data and a second sub-image data each having the same amount of information as one picture plane portion of the first image data, and supplying the first and second sub-image data to two of the plurality of memory means, respectively; and restoration means for restoring one picture plane portion of the second image data by using the first sub-image data and the second sub-image data respectively output from the two of the plurality of memory means in which the first and second sub-image data are memorized.

Other objects and features of the present invention will be apparent from the following detailed description of the invention with reference to the attached drawings.

DETAILED DESCRIPTION OF THE PREFERRED EMBODIMENTS

Embodiments of this invention will now be described with reference to the drawings.

Figure 5:
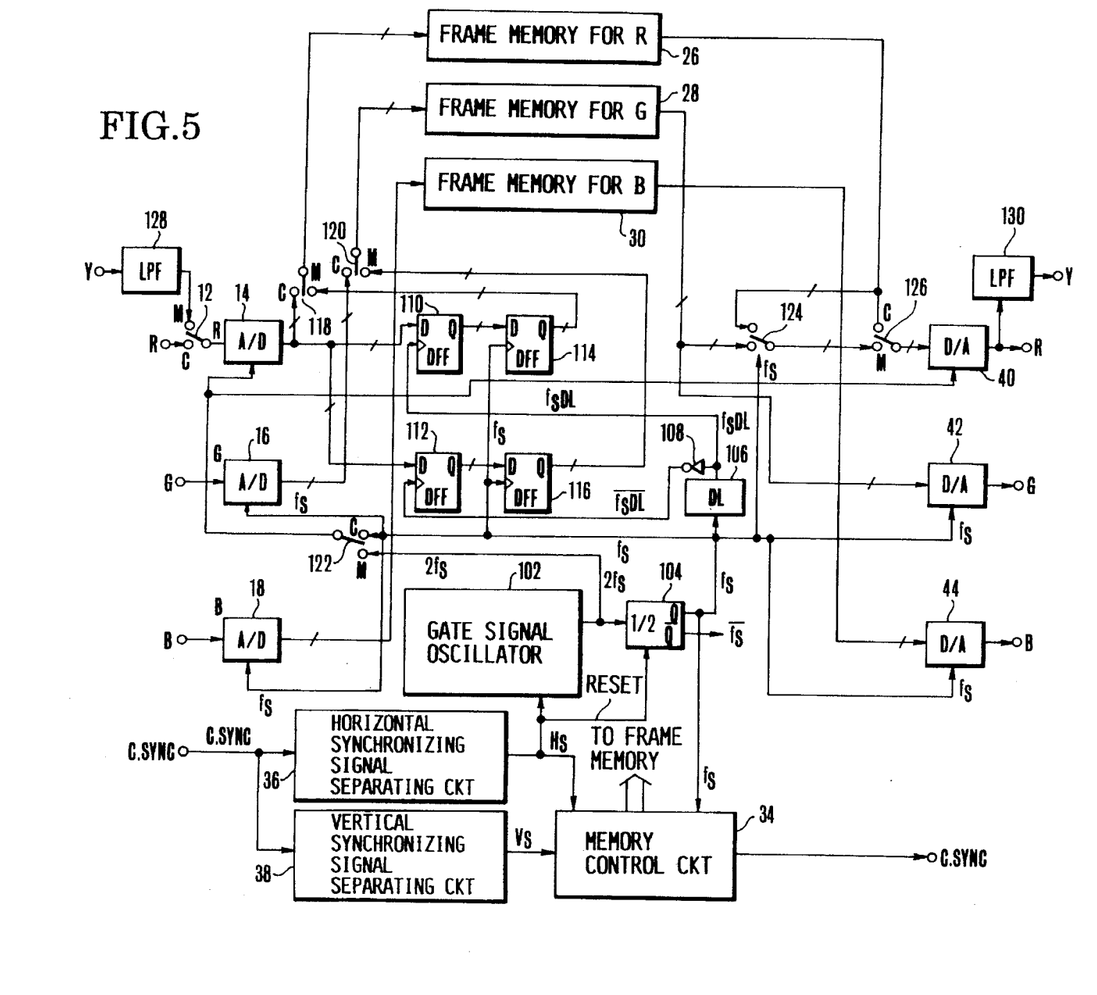
FIG. 5 is a schematic diagram illustrating the construction of an image signal memorizing apparatus in accordance with an embodiment of this invention.

FIG. 5 schematically shows the construction of an image signal memorizing apparatus in accordance with an embodiment of this invention.

In FIG. 5, the components which are identical with those of the apparatus shown in FIG. 1 have the same reference numerals, the explanation thereof being omitted.

The image signal memorizing apparatus shown in FIG. 5 includes a gate signal oscillator 102 adapted to generate a sampling clock signal having a frequency of 780×2$f_H$ (24.54 MHz), i.e., double the frequency $f_S$ of the color image sampling clock signal $f_S$; a ½ counter 104, a pulse delay circuit (DL) 106, an inverter 108, D-type flip-flops (DFF) 110, 112, 114 and 116, change-over switches 118, 120, 122, 124 and 126, an input LPF 128 for monochrome image signals only, and an output LPF 130 for monochrome image signals only.

The operation of the embodiment shown in FIG. 5 will now be described.

Figure 2D:
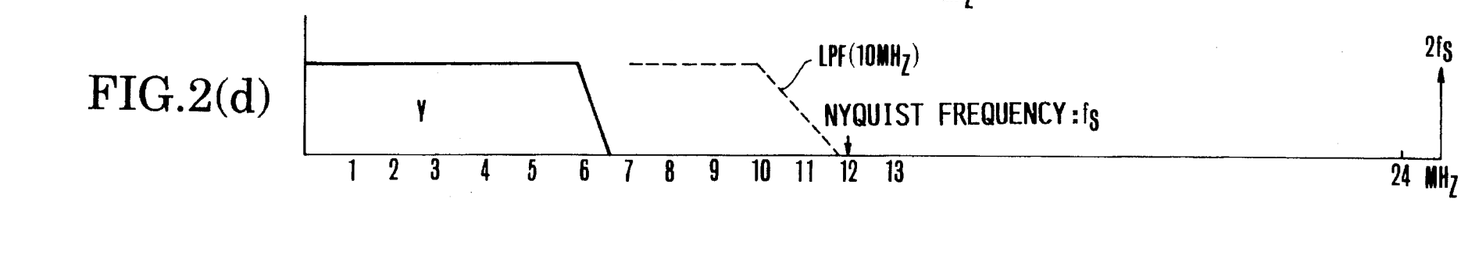

When memorizing a monochrome image signal, the command for memorizing a monochrome image signal is issued from a system controller (not shown), and the switch 122 is connected to the terminal M, a sampling clock signal having a frequency of 2$f_S$ (24.54 MHz) being supplied from the gate signal oscillator 102 to the A/D converter 14. At the same time, the switch 12 is connected to the terminal M, and the luminance signal (Y) which has passed through the input LPF 128 for monochrome image signals is input to the A/D converter 14. The band restriction of the input LPF 128 is set, as shown in FIG. 2(d), at ca. 10 MHz, which corresponds to the sampling clock 2$f_S$. The monochrome image data which has been A/D converted at the A/D converter 14 in accordance with the sampling clock signal 2$f_S$ is transmitted to the DFF 110. The trigger input of the DFF 110 is a clock $f_S$DL which is obtained by delaying at the pulse delay circuit 106 the clock $f_S$ obtained by dividing by half at the ½ counter 104 the clock 2$f_S$ which is an output of the gate signal oscillator 102.

Figure 6:
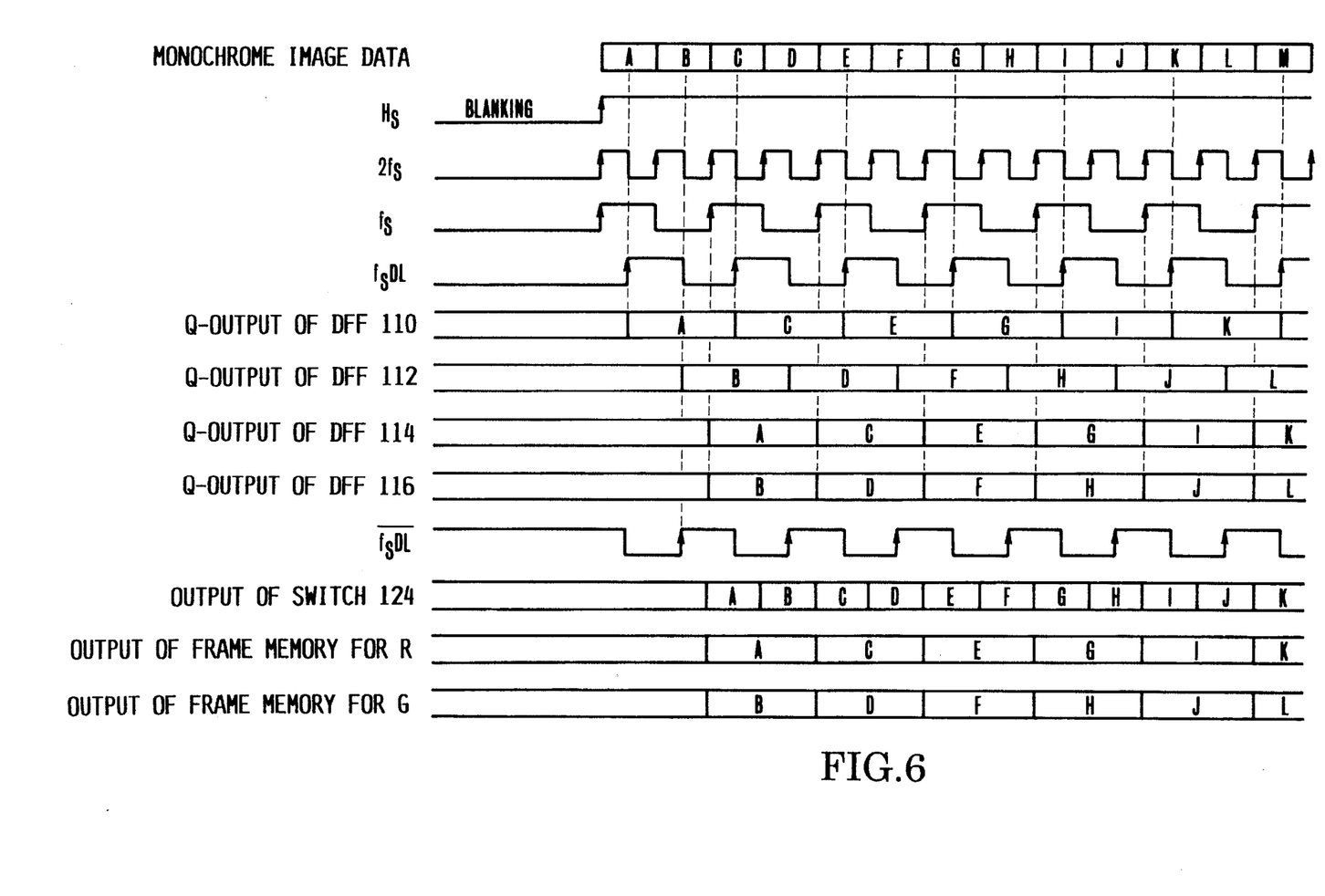
FIG. 6 shows the operational timing chart of the image signal memorizing apparatus shown in FIG. 5.

The timing chart of FIG. 6 shows the relation between the clocks $f_S$DL, $f_S$, 2$f_S$ and the input of the DFF 110, i.e., the output of the A/D converter 14, etc. In the timing chart, $H_S$ denotes the horizontal synchronizing signal. The oscillation of clock 2$f_S$ starts simultaneously with the termination of the horizontal blanking section of the horizontal synchronizing signal $H_S$. Now, suppose the output of the A/D converter 14 (i.e., the monochrome image data) is A, B, C, D . . . (FIG. 6), Q-output of the DFF 110 is output in the order of A, C, E . . . , as shown in FIG. 6. Subsequently, the Q-output of the DFF 110 is transmitted to the data input of the DFF 114, where it is synchronized with the clock $f_S$ so that the Q-output of the DFF 114 shown in FIG. 6 is obtained. This Q-output of the DFF 114 serves as the image data to be input to the frame memory 26 for R when a monochrome image signal is memorized.

On the other hand, the output of the A/D converter 14 is also transmitted to the data input of the DFF 112, where it is triggered by the $\overline{f_S DL}$ signal obtained by inverting the clock $f_S DL$ at the inverter 108, so that the Q-output of the DFF 112 shown in FIG. 6 is obtained. Suppose, for example, the output of the A/D converter 14 is output in the order of A, B, C, D . . . (FIG. 6), the Q-output of the DFF 112 is output in the order of B, D, F . . . . as shown in FIG. 6. Subsequently, the Q-output of the DFF 112 is transmitted to the data input of the DFF 116, where it is synchronized with the clock $f_S$, so that the Q-output of the DFF 116 shown in FIG. 6 is obtained. This Q-output of the DFF 116 serves as the image data to be input to the frame memory 28 for G when a monochrome image signal is memorized.

In the manner as described above, when a monochrome image signal is memorized, the input luminance signal is A/D converted and, then, is supplied in parallel to the respective frame memories 26 and 28 for R and G alternately, so that it is written in the frame memories 26 and 28 by the control of the memory control circuit 34.

Next, the operation of reading out the monochrome image data written in the respective frame memories 26 and 28 for R and G will be described.

When the command for reading out the monochrome image data is issued from the system controller (not shown), the switches 122 and 126 are connected to the terminal M. At the same time, signals which are identical to the Q-output of the DFF 114 and the Q-output 116 shown in FIG. 6 are supplied, in synchronization with the signal $H_S$ and the clock $f_S$, from the memory control circuit 34 to the frame memories 26 and 28 for R and G, so that frame memory outputs for R and G shown in FIG. 6 are obtained from the frame memories 26 and 28 for R and G, each of these frame memory outputs being supplied to a switch 124. This switch 124 forms its output shown in FIG. 6 by alternately outputting the output of the frame memory 26 for R and the output of the frame memory 28 for G, in synchronization with the clock $f_S$ output from the ½ counter 104, and supplies it to a D/A converter 40 through the switch 126 connected to the terminal M.

The D/A converter 40 then performs D/A conversion of the signal supplied from the switch 124. Since at this time the switch 122 is connected to the terminal M, as described above, a clock of $2f_S$ (24.54 MHz) for D/A conversion is supplied to the D/A converter 40. In accordance with this clock, the signal supplied from the switch 124 is D/A converted and supplied to the output LPF 130. Like the input LPF 128, the output LPF 130 has a restricted band area of ca. 10 MHz, and the same band as the one before being memorized in the memory is secured for the monochrome image signal which is band-restricted by this output LPF 130, so that deterioration in picture quality can be avoided.

Further, this embodiment makes it possible to memorize and read out a monochrome image signal having a wide band with the unmodified conventional frame memories 26, 28 and 30 for R, G and B as well as the conventional memory control circuit 34, without involving deterioration in picture quality. Furthermore, color image signals can be memorized in the memories and read out therefrom in the same manner as in the conventional apparatus by connecting the switches 12, 118, 120, 122 and 126 in FIG. 5 to the terminal C.

As described above, the present invention makes it possible to provide an image information signal processing apparatus which is capable, with a simple construction, of memorizing image information signals having different bands, without involving deterioration in picture quality.

What is claimed is:

1. An image information signal processing apparatus adapted to process a first image information signal having at least a first image signal and a second image signal which is different from said first image signal, and a second image information signal having a third image signal the frequency band of which is wider than that of said first image signal or said second image signal, said image information signal processing apparatus comprising:

(A) image data formation means, arranged to selectively input said first image information signal or said second image information signal, for forming, when said first image information signal is input, first image data corresponding to said first image signal and second image data corresponding to said second image signal by performing sampling of said first image information signal in accordance with a first sampling signal having a first sampling frequency, and for forming, when said second image information signal is input, third image data corresponding to said third image signal by performing sampling of said second image information signal in accordance with a second sampling signal having a second sampling frequency which is higher than said first sampling frequency;

(B) first storage means capable of storing one picture plane portion of said first image data formed by said image data formation means;

(C) second storage means capable of storing one picture plane portion of said second image data formed by said image data formation means; and (D) image data supply means for supplying, when said first image information signal is input to said image data formation means, said first image data and said second image data formed by said image data formation means to said first storage means and said second storage means, respectively, and, when said second image information signal is input to said image data formation means, said image data supply means being arranged to store a part of said third data formed by said image data formation means in said first storage means and to store the other part of said third image data in said second storage means.

2. An apparatus according to claim 1, wherein said first image information signal further includes a fourth image signal which is different from said first image signal, said second image signal or said third image signal.

3. An apparatus according to claim 2, wherein said first image signal includes a red-color signal, said second image signal includes a green-color signal, and said fourth image signal includes a blue-color signal.

4. An apparatus according to claim 1, wherein said third image signal includes a monochrome signal.

5. An apparatus according to claim 1, wherein, said image data formation means includes:

(a) sampling signal generating means for generating and selectively outputting said first sampling signal and said second sampling signal;

(b) analog-to-digital conversion means, arranged to selectively input said first image signal and said third image signal, for performing analog-to-digital conversion of the input image signal in accordance with said first or second sampling signal output from said sampling signal generating means, and, for forming and outputting said first image data corresponding to said first image signal and said third image data corresponding to said third image signal; and (c) sampling signal change-over supply means for supplying, when said first image signal is input to said analog-to-digital conversion means, said first sampling signal output from said sampling signal generating means to said analog-to-digital conversion means, and for supplying, when said third image signal is input to said analog-to-digital conversion means, said second sampling signal output from said sampling signal generating means to said analog-to-digital conversion means.

6. An apparatus according to claim 1, wherein said image data supply means includes:

(a) first latch means for latching said third image data in accordance with a first timing pulse and for supplying the latched image data to said first storage means; and (b) second latch means for latching said third image data in accordance with a second timing pulse whose frequency is equal to that of said first timing pulse and whose phase is different from that of said first timing pulse, and for supplying the latched image data to said second storage means.

7. An apparatus according to claim 6, wherein said first timing pulse or said second timing pulse has the same frequency as that of said first sampling signal.

8. An apparatus according to claim 7, wherein said second sampling signal has double the frequency of said first sampling signal.

9. An apparatus according to claim 8, wherein a phase difference of 180 degrees exists between said first timing pulse and said second timing pulse.

10. An image data memorizing apparatus for memorizing first image data and second image data whose information amounts for one picture plane are different from each other, comprising:

(A) a plurality of memory means capable of memorizing one picture plane portion of said first image data;

(B) input means for selectively inputting said first image data and said second image data;

(C) image data supply means for supplying one picture plane portion of said first image data input through said input-means to one of said plurality of memory means, and for dividing one picture plane portion of said second image data input through said input means into a first sub-image data and a second sub-image data each having the same amount of information as one picture plane portion of said first image data, and supplying said first and second sub-image data to two of said plurality of memory means, respectively; and (D) restoration means for restoring one picture plane portion of said second image data by using said first sub-image data and said second sub-image data respectively output from said two of said plurality of memory means in which said first and second sub-image data are memorized.

11. An apparatus according to claim 10, wherein said image data supply means includes:

(A) first latch means for sequentially latching and outputting said second image data with a first timing; and (B) second latch means for sequentially latching and outputting said second image data with a second timing whose phase is different from that of said first timing.

12. An apparatus according to claim 10, wherein said restoration means includes change-over means for alternately selecting and outputting said first sub-image data and said second sub-image data output from said two of said plurality of memory means, each for a predetermined period.

13. An image data information signal processing method for processing a first image information signal having at least a first image signal and a second image signal which is different from said first image signal, and a second image information signal having a third image signal which is different from said first image signal or said second image signal, comprising:

(A) a first step of inputting said first information signal and said second information signal in a switching manner; and (B) a second step of storing the first image signal in first storage means and storing the second image signal in second storage means when said first image information signal is inputted at the first step, and storing a part of the second image information signal in said first storage means and storing the other part of said second image information signal in said second storage means when said second image information signal is inputted at the first step.

14. A method according to claim 13, wherein said third image signal has a frequency band which is wider than that of said first image signal or said second image signal.

15. A method according to claim 14, wherein said second step includes a first image data forming step of forming a first image data corresponding to said first image signal and a second image data corresponding to said second image signal, by sampling the first image information signal on the basis of a first sampling signal having a first sampling frequency.

16. A method according to claim 14, wherein said second step further includes a second image data forming step of forming a third image data corresponding to said third image signal, by sampling the second image information signal on the basis of a second sampling signal having a second sampling frequency which is higher than said first sampling frequency.

17. A method according to claim 16, wherein said second step further includes an image data supplying step of supplying the third image data formed by said second image data forming step alternately to said first storage means and said second storage means at every predetermined period.

18. A method according to claim 16, wherein said second sampling signal has a frequency which is two times as high as that of said first sampling signal.

19. A method according to claim 13, wherein said first image information signal further includes a fourth image signal which is different from said first image signal, said second image signal or said third image signal.

20. A method according to claim 19, wherein said first image signal includes a red-color signal, said second image signal includes a green-color signal, and said fourth image signal includes a yellow-color signal.

21. A method according to claim 13, wherein said third image signal includes a monochrome signal.

22. An image data storage apparatus capable of optionally storing first image data and second image data which are mutually different from each other in one picture plane portion of information content, comprising:

(A) a plurality of storage means each having storage capacity capable of storing one picture plane portion of said first image data; and (B) image data storage control means for providing such a control that when said first image data is stored, one picture plane portion of said first image data is stored in one of said plurality of storage means, and when said second image data are stored, one picture plane portion of said second image data is divided according to respective data amounts storable by respective storage means of said plurality of storage means and divided data are stored in said plurality of storage means.

23. An apparatus according to claim 22, wherein said image data storage control means includes:
(a) first latch means for sequentially latching said second image data in a first timing; and
(b) second latch means for sequentially latching said second image data in a second timing different from the first timing.

24. An apparatus according to claim 22, wherein said first image data is formed by performing sampling of a first image signal having a first frequency band in accordance with a first sampling signal having a first sampling frequency, and said second image data is formed by performing sampling of a second image signal having a second frequency band wider than the first frequency band in accordance with a second sampling signal having a second sampling frequency higher than the first sampling frequency.

25. An apparatus according to claim 24, wherein said second sampling frequency is two times as high as the first sampling frequency.

26. An apparatus according to claim 24, wherein said first image signal is any one of a red image signal, a green image signal and a yellow image signal.

27. An apparatus according to claim 24, wherein said second image signal is a black and white image signal.

28. An image information signal processing method for processing a first image information signal having at least a first image signal and a second image signal which is different from said first image signal, and a second image information signal having a third image signal which is different from said first image signal and said second image signal, comprising:
(A) a step of storing the first image signal in first storage means and storing the second image signal in second storage means, when said first image information signal is stored; and
(B) a step of storing a part of the second image information signal in said first storage means and storing the other part of said second image information signal in said second storage means, when said second image information signal is stored.

29. A method according to claim 28, wherein said third image signal has frequency band which is wider than that of said first image signal or said image signal.

30. A method according to claim 28, wherein said first image information signal has a fourth image signal different from the first image signal, the second image signal and the third image signal.

31. A method according to claim 30, wherein the first image signal, the second image signal and the fourth image signal include a red image signal, green image signal and yellow image signal respectively.

32. A method according to claim 28, wherein the third image signal includes a monochrome image signal.

33. An image information signal processing method for processing a first image information signal having at least a first image signal and a second image signal which is different from said first image signal, and a second information signal having a third image signal which is different from said first image signal and said second image signal, comprising:
(A) a step of storinq the first image signal in first storage means and storing the second image signal in second storage means, when said first image information signal is stored;
(B) a step of performing sampling of the first image information signal in accordance with a first sampling signal having a first sampling frequency to form a first image data corresponding to the first image signal and second image data corresponding to the second image signal and
(C) a step of storing a part of the second image information signal in said first storage means and storing the other part of said second storage means, when said second image information signal is stored.

34. A method according to claim 33, further comprising the step of performing sampling of the second image information signal in accordance with a second sampling signal having a second sampling frequency higher than said first sampling frequency to form a third image data corresponding to the third image signal.

35. A method according to claim 34, further comprising the step of supplying said third image data alternately to said first storage means and said second storage means for each predetermined period of time.

36. A method according to claim 34, wherein said second sampling signal has a frequency twice as high as that of said first sampling signal.

* * * * *

UNITED STATES PATENT AND TRADEMARK OFFICE
CERTIFICATE OF CORRECTION

PATENT NO. : 5,557,426

DATED : September 17, 1996

INVENTOR(S) : Tsuguhide Sakata

It is certified that error appears in the above-indentified patent and that said Letters Patent is hereby corrected as shown below:

Col. 1, line 6, change "Mar. 6, 1993" to -- Mar. 9, 1993 --.

Col. 10, line 20, change "storinq" to -- storing --.

Signed and Sealed this

Seventeenth Day of June, 1997

Attest:

BRUCE LEHMAN

Attesting Officer

Commissioner of Patents and Trademarks